United States Patent [19]

Lyons et al.

[11] Patent Number: 5,027,260
[45] Date of Patent: Jun. 25, 1991

[54] VEHICULAR LIGHTBAR ASSEMBLY

[75] Inventors: Harold W. Lyons, Killingworth; James L. Stopa, Old Saybrook, both of Conn.

[73] Assignee: Whelen Technologies, Inc., Chester, Conn.

[21] Appl. No.: 403,710

[22] Filed: Sep. 6, 1989

[51] Int. Cl.$^5$ .............................................. B60Q 1/26
[52] U.S. Cl. ..................................... 362/74; 362/240; 362/249
[58] Field of Search ................. 362/74, 240, 249, 219; 340/468, 471, 472, 474

[56] References Cited

U.S. PATENT DOCUMENTS

| | | | |
|---|---|---|---|
| 2,496,618 | 2/1950 | Cox et al. | 362/249 |
| 4,189,709 | 2/1980 | Gosswiller | 362/219 |
| 4,320,385 | 3/1982 | Bleiweiss et al. | 340/472 |
| 4,357,595 | 11/1982 | Gosswiller | 340/472 |
| 4,543,622 | 9/1985 | Menke et al. | 362/219 |
| 4,577,178 | 3/1986 | Hitora | 340/472 |
| 4,595,904 | 6/1986 | Gosswiller et al. | 340/472 |
| 4,620,268 | 10/1986 | Ferenc | 362/219 |
| 4,633,375 | 12/1986 | Tres | 362/249 |
| 4,635,039 | 1/1987 | Gosswiller | 340/474 |
| 4,942,503 | 7/1990 | Lyons | 362/74 |

Primary Examiner—Ira S. Lazarus
Assistant Examiner—Richard R. Cole
Attorney, Agent, or Firm—Chilton, Alix & Van Kirk

[57] ABSTRACT

A modular-type lightbar assembly has an elongated base having a bottom panel and a pair of oblique integrally extending front and rear sides. Lens elements are mounted to the base and a cover by lock and groove-type connections. Warning beacon units are mounted to platforms supported on base. The beacon units rotate for sequentially directing light through the front and rear lens elements. The beacon units have an efficient integral base which mounts the rotating beacon and a brush assembly for the motor. An electronic controller is employed to apply a pulse width modulated current to the beacon motor so that a fast and slow motor speed may be selected.

15 Claims, 6 Drawing Sheets

VEHICULAR LIGHTBAR ASSEMBLY

BACKGROUND OF THE INVENTION

1. Field of the Invention

This invention relates generally to lightbar assemblies which are mounted to the top of vehicles. More particularly, the present invention relates to modular type lightbar assemblies which may be employed by emergency vehicles, such as ambulances, police cares and fire emergency vehicles.

2. Description of the Prior Art

The lightbar assemblies to which the invention relates have in the past been built around an I-beam type structural member which spans the assembly. U.S. Pat. No. 4,588,118 and U.S. Pat. No. 4,620,268, both of which are assigned to the assignee of the present invention, each disclose lightbar assemblies which employ an I-beam as the principal structural member. The I-beam members provide an efficient low profile, modular structure of high structural integrity and a high degree of versatility. However, the I-beam does present space constraints which limit flexibility in implementing a wide range of emergency signal configurations. In particular, the conventional lightbar assemblies which employ rigid frame members spanning the lightbar assemblies have had insufficient space for installation of warning lights comprising halogen lamps with associated rotating mirrors.

SUMMARY OF THE INVENTION

Briefly states, the present invention is a lightbar assembly for an emergency vehicle or the like. The assembly comprises, in a preferred embodiment, an elongated base which has a bottom panel and two sides which integrally extend therefrom at an oblique angle to the bottom panel. Rolls integrally extend inwardly from the sides to define transversely spaced support channels. Upper portions of the sides include transversely spaced mounting grooves. A platform is received, in a pair of oppositely facing the support channels. A first lens element forms a front light transmissive panel which has a longitudinally extending tongue received in one of the spaced mounting grooves in the base. A second lens element forms a rear light transmissive panel which has a second longitudinally extending tongue received in the other mounting groove. A cover is mounted to the front and rear lenses and connects therewith in generally tongue-and-groove-type engagements, the cover, base and lens elements defining a housing in which light generators may be mounted on the platform.

In the preferred embodiment, rotatable warning beacons are mounted to the platform. The beacons include a lamp for emitting radiation and an associated reflector for reflecting the radiation. A motor rotates the reflector so that the radiation is sequentially transmitted through the front and rear lens elements as a series of discrete flashes. End caps are mounted to end portions of the base and the front and rear lens elements and the cover for interlocking the base, the front and rear lens elements and the cover and for enclosing the warning beacons. An audio warning unit may also be mounted to the base for generating an audible warning signal. The audio warning unit is disposed between sets of front and rear lens elements. Dividers are employed at intermediate longitudinal positions for engaging peripheral portions of the front and rear lens elements for transversely interlocking the elements. A frame member which includes an upstanding panel may be mounted in the support channels for mounting the audio warning unit.

A rotatable beacon assembly in accordance with the invention includes an integrally formed base having a pair of brush holders and a spindle which is located between the holders. An upstanding bracket also extends from the base. A motor is mounted to the bracket. Brushes are mounted to the holders. The brushes electrically connect with the motor which is in drive engagement with a worm drive. A worm wheel, engageable with the worm drive, is rotatably mounted to the spindle. The worm wheel also mounts a pair of slip rings which are engaged by associated of the brushes. A beacon, which includes a lamp and an associated reflector, is mounted in fixed rotatable relationship with the worm wheel. The brush holders each comprise an upstanding boss having a plurality of fingers for mounting a brush. The worm drive is rotatable about a first axis and the worm wheel, which meshes with the worm gear, is rotatable about a second axis, which is generally orthogonal to the first axis.

The present invention also encompasses a novel electronic controller for the warning beacon which comprises a circuit for deriving a substantially constant voltage and current from the vehicle power supply for application to an incandescent lamp. The controller includes a switch which is actuatable between states commensurate with fast and a slow motor speed. A modulation circuit is responsive to the switch state and pulse width modulates the source voltage when the slow motor speed is selected. A second circuit, responsive to they "fast" switch state, applies the source voltage to the motor. The current supplied to the motor is isolated from the current supplied to the lamp. The modulation circuit includes a timer which generates a pulsed output signal which is applied to a transistor for modulating the voltage applied to the motor when the slow motor speed is selected. A second circuit, responsive to the "fast" switch state, applies the source voltage to the motor. The timer is disabled when the fast motor speed is selected. In the disclosed embodiment, an opto-coupler comprising a photo-emitter and a photodetector is employed for disabling the timer, the input signal to the opto-coupler being remotely generated by the operator of the vehicle on which the light bar is installed.

An object of the invention is to provide a new and improved vehicular lightbar assembly.

Another object of the invention is to provide a new and improved vehicular lightbar assembly of efficient construction which is readily adaptable for a wide range of warning signal configurations.

A further object of the invention is to provide a new and improved modular-type lightbar assembly employing a plurality of rotatable warning beacons.

A yet further object of the invention is to provide a new and improved electronic controller for a warning beacon employed in a lightbar assembly.

Other objects and advantages of the invention will become apparent from the drawings and the specification.

DETAILED DESCRIPTION OF THE INVENTION

With reference to the drawings, wherein like numerals represent like parts throughout the figures, a vehicular lightbar assembly in accordance with the present invention is designated generally by the numeral 10. The vehicular lightbar assembly is adapted for mounting at the top of an emergency vehicle, such as an ambulance, police car or fire emergency vehicle. The lightbar assembly 10 has a low profile and a length which spans a substantial portion of the width of the vehicle. The lightbar assembly 10 is characterized by a modular design which allows wide latitude in the selection of the number and location of the emergency warning devices which may be integrated into the assembly, i.e., the light bar may be configured in accordance with the requirements of a specific application.

Figures 2, 3:
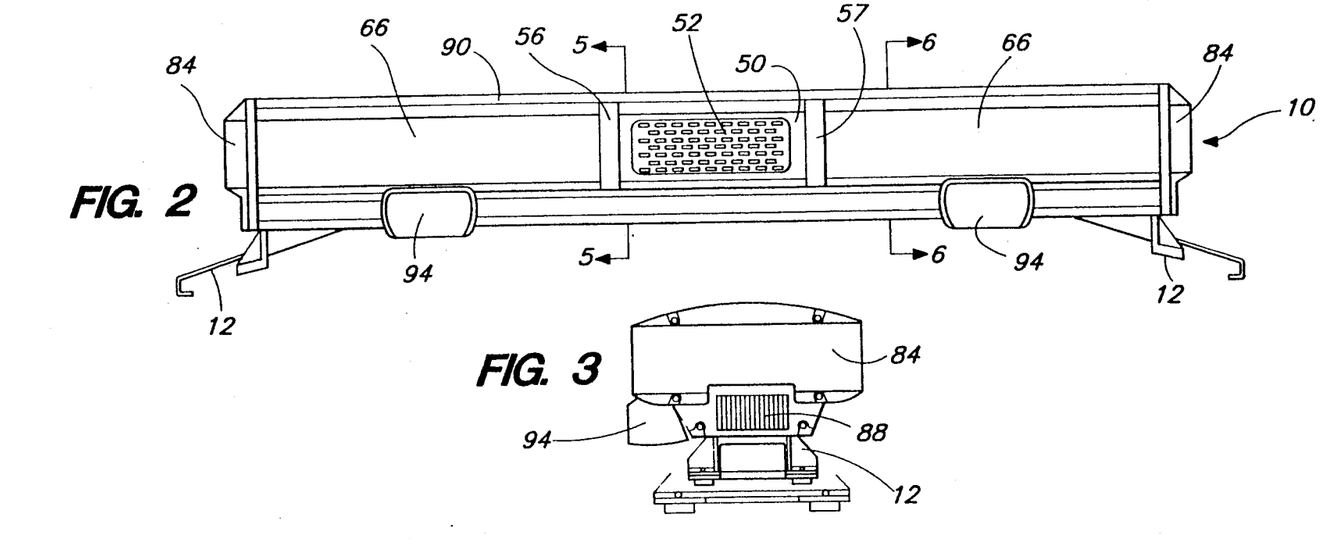
FIG. 2 is a front elevational view of the lightbar assembly of FIG. 1.
FIG. 3 is a side elevational view of the lightbar assembly of FIG. 1.
Figure 4:
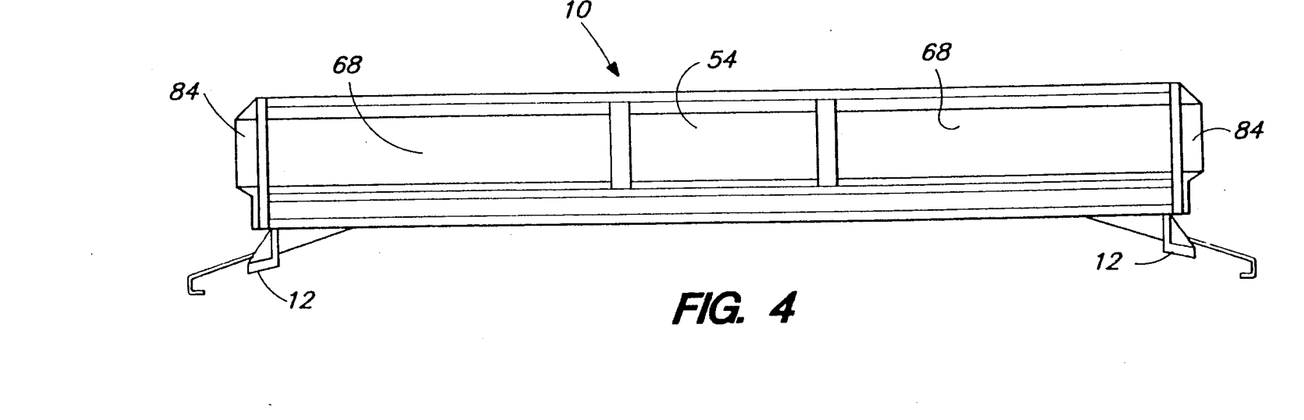
FIG. 4 is a rear view of the lightbar assembly of FIG. 1.

The lightbar assembly is secured to the top of the vehicle (not illustrated) by means of conventional mounting foot assemblies 12 (FIGS. 2-4) which are disposed at opposing longitudinal end locations of the lightbar assembly. The mounting foot assemblies 12 are adjustable for a wide variety of vehicular makes, models, and types. The mounting foot assemblies essentially engage the underside of the lightbar assembly at the opposing end locations and may be similar in form and function to the mounting foot assemblies disclosed in U.S. Pat. No. 4,588,118.

The lightbar assembly 10 electrically communicates with the vehicle power supply (not illustrated) to provide electrical power for the assembly warning signals. The lightbar assembly also electrically communicates with command switches in the vehicle passenger compartment to permit the operator to selectively operate the lightbar assembly as will be described hereinafter.

The structural integrity of the lightbar assembly 10 is provided by an integrated multi-component assembly which is constructed in an efficient interlocking manner. The lightbar assembly 10 has a low profile which not only is structurally suitable for the vehicular application, but has a modular construction which provides a wide range of possible warning signal configurations. An extruded aluminum base 20 spans the length of the lightbar assembly. The base 20 functions as the principal support structure for the lightbar assembly. The extruded base comprises a bottom panel 22 and integral front and rear sides or panels 24 and 26. The bottom panel 22 is horizontally disposed across the vehicle top when the assembly is mounted to the vehicle. The front panel 24 and the rear panel 26 extend respectively frontally and rearwardly in an angled orientation to the bottom panel. The bottom panel 22 also has an opening 38 for receiving an electrical cable 39 comprising conductors which deliver power and command signals to the lightbar assembly.

The exteriors of the front and rear panels form spaced grooves which slidably receive elongated strips 28 affixed with the name plate and identifying information for the lightbar assembly. The lower portions of the base form a pair of transversely spaced opposing channels 30 which receive the mounting foot assemblies 12. Pairs of laterally spaced, integral inwardly extending rails define opposed slots 32 and 34 which extend longitudinally along the respective panels 24 and 26 of the base 20 at an intermediate vertical position. The upper outer portions of each of the front and rear panels have respective generally outwardly facing longitudinally extending grooves 36 and 37.

Figure 5:
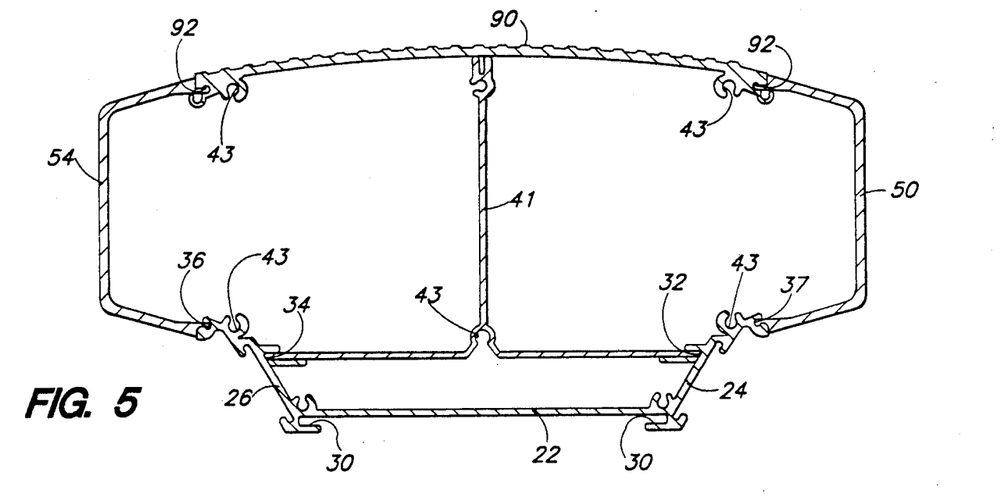
FIG. 5 is a cross-sectional view of the lightbar assembly of FIG. 2 taken along the line 5—5 thereof, portions being removed.

Various warning signal modules may be incorporated into the lightbar assembly. An audio warning or siren unit 40 disposed centrally of the lightbar assembly employs an extruded driver support frame 41. The driver frame 41 includes an upstanding central panel, having an opening which mounts a siren driver 42, which extends upwardly from a platform. As may be seen from FIG. 5, outer edge portions of driver support frame 41 are slidably received in the opposed slots 32 and 34 of the extruded base 20. The driver frame 41 includes bottom panel openings 44 which mount grommets to provide access for the electrical leads to the driver 42. An inner bell 46 and a siren tip 48 are mounted to the driver 42. The bell 46 and tip 48 are disposed on an opposite side of the upstanding panel from the driver 42.

A frontally projecting, quasi-C-shaped element 50 has an integral lower tongue which slidably interlocks with the base groove 36. The front element 50 has an opening. A siren grill 52 is mounted across this opening. A rearwardly projecting, quasi-C-shaped element 54 also includes an integral tongue which interlocks with the groove 37 of the base so that the siren unit 40 is frontally and rearwardly enclosed.

Dividers 56 and 57 are dimensioned and shaped to provide complementary retainer flanges for receiving the longitudinal end portions of the driver frame 41, the front siren element 50, and the rear siren element 54 to reinforce and interlock the structures into a structurally rigid unit. Fasteners may be threaded through the dividers into integrally formed sockets 43 of the bottom or platform portion of the driver frame 41 to enhance the structural integrity of the siren unit. The siren unit 40 is transversely centrally disposed on the base 20 with the longitudinally spaced dividers 56 and 57 providing front and rear exposed flange-like retaining bands.

In the disclosed embodiment a pair of substantially identical warning light sub-assemblies 60 are mounted at opposed sides of the central siren unit 40. Each warning light sub-assembly 60 includes a platform 62. A pair of elongated sound isolator strips 64 are mounted along transversely spaced edges of the platform 62. The platform/strips are slidably mounted in the intermediate channels 32 and 34 of the extruded base 20. A rotatable warning beacon unit 70 is mounted to the platform 62 by means of screw/grommet fastener assemblies which extend through a beacon cover 72. An upright stepped mirror assembly 76 is also mounted to the platform 62 between the beacon unit 70 and the siren unit 40.

A flattened inverted U-shaped mounting bracket 78 is mounted to the notched end portion of the platform 62. The bracket 78 mounts an "alley" light 79 comprising a reflector 80 which receives a high intensity halogen lamp 82. Front and rear quasi-C-shaped lens elements 66 and 68 have transversely extending integral tongues which slidably interlock in the respective grooves 36 and 37 of the extruded base 20 to frontally and rearwardly enclose each warning light sub-assembly 60. The lens elements may have fluted inner surfaces defined by spreader optic bands which are separated by flats.

The dividers 56 and 57 have flanges which receive the end portions of the lens elements 66 and 68. The outer end portions of the lens elements are capped by an end cap 84. The end cap 84 has a flange-like structure dimensioned for retaining the outer end portions of the lens elements and for mounting over the ends of the extruded base 20 in complementary fashion. A gasket 86 is interposed between the end cap and the outer end portions of the lens elements 66 and 68 and the extruded base 20. Each end cap 84 includes an opening. A lens element 88 is mounted across this opening to provide a lens cover for the end "alley" light 79. Typically, the "alley" lights at each end of the lightbar are separately and selectively energized from the main electrical power supply.

A top cover 90 of aluminum longitudinally spans the lightbar assembly. The cover 90 has a slight convex contour which terminates in transversely spaced longitudinally extending grooves 92. The grooves 92 slidably interlock with the corresponding tongues of the front and rear lens elements 66 and 68, the front and rear siren elements 52 and 54 and the dividers 56 and 57. The dividers 56 and 57 are preferably dimensioned so that the underside of the top cover 90 engages and rests on the top edge of the dividers. The end caps 84 abut against the end portion of the cover 92 to complete the integrated interlocking housing structure. The foregoing components may be secured in positioned by threaded fasteners which are longitudinally driven into integrally formed sockets 43 of the various components.

Figure 6:
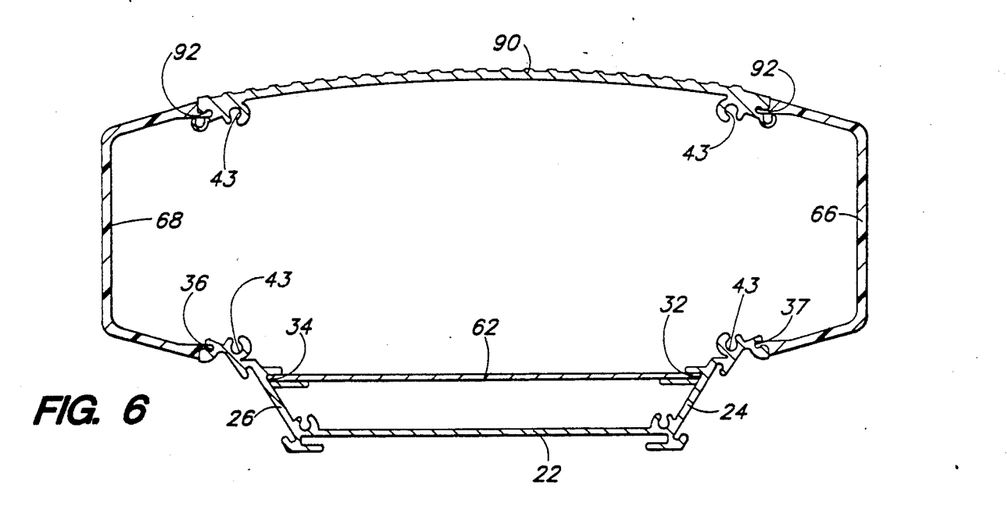
FIG. 6 is a cross-sectional view of the lightbar assembly of FIG. 2 taken along the line 6—6 thereof, portions being removed.

As will be obvious from the above description and the drawings, the aluminum cover 90 is opaque and thus light generated within the lightbar assembly is not lost by transmission through the top of the assembly and a narrowly defined, and thus highly visible, warning device is provided. As may be seen from FIGS. 1, 5 and 6, the width of cover 90 exceeds the width of the bottom panel 22 and the platform 62 which supports the light generators, i.e., the rotatable warning beacon units 70.

"Take-down" light modules 94 are also mounted at the lower front mid-section of each of the warning light sub-assemblies 60. The "take-down" modules are typically halogen lamps and associated reflectors. The "take-down" lights function as spot lights which generate an intense light so that it is extremely difficult in the dark for a person in the illumination field to determine the precise position of a person standing rearwardly of the lightbar assembly. The electrical cable 39 leads through the opening 38 in the base and connects with an electrical harness 96 which is routed through the trough defined by the space in base 20 located below the platform 62 to provide an electrical network for the lightbar assembly. Typically, the "take-down" lights are operated independently.

Figure 1:
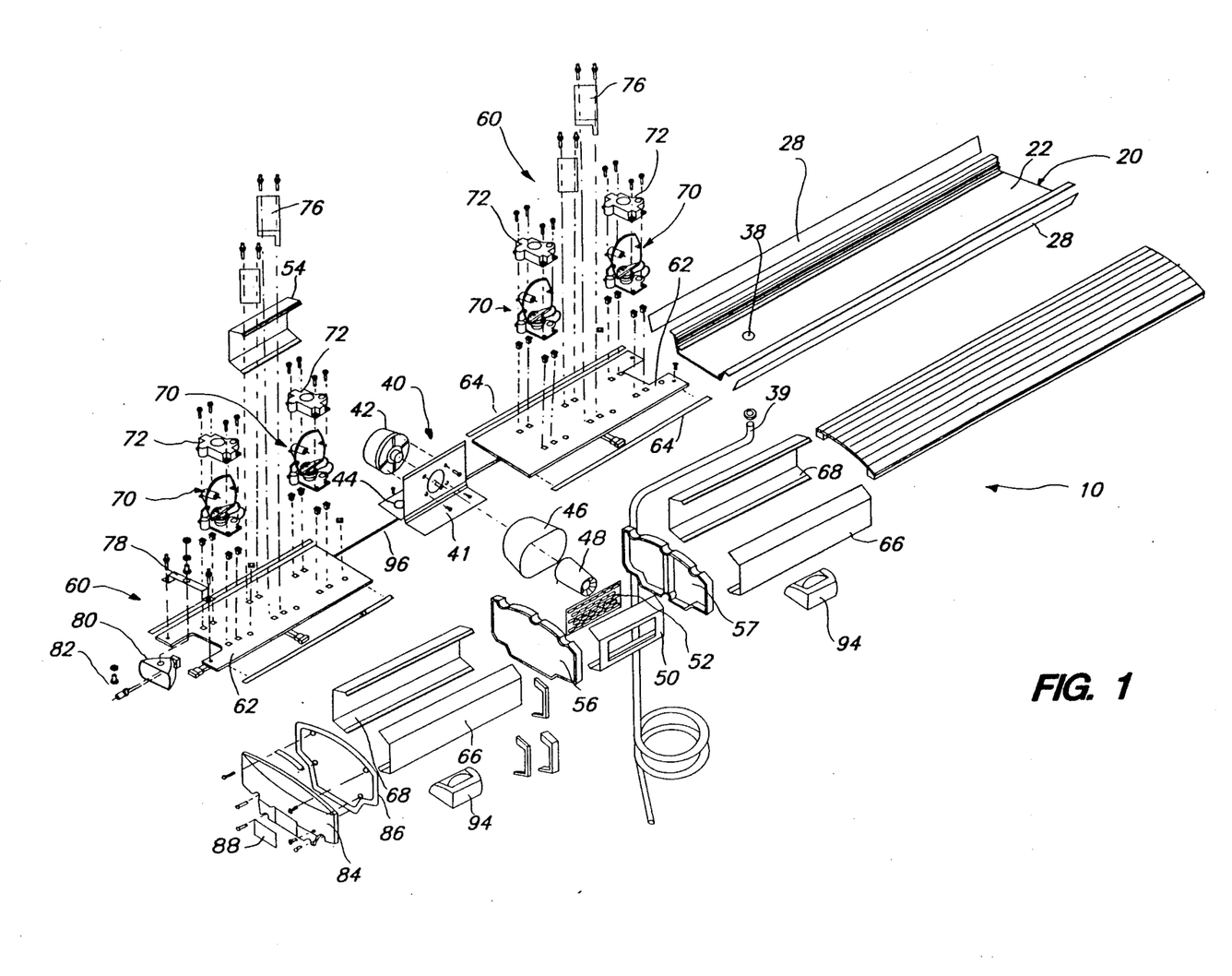
FIG. 1 is an exploded view of a vehicular lightbar assembly in accordance with a first embodiment of the present invention.
Figure 7:
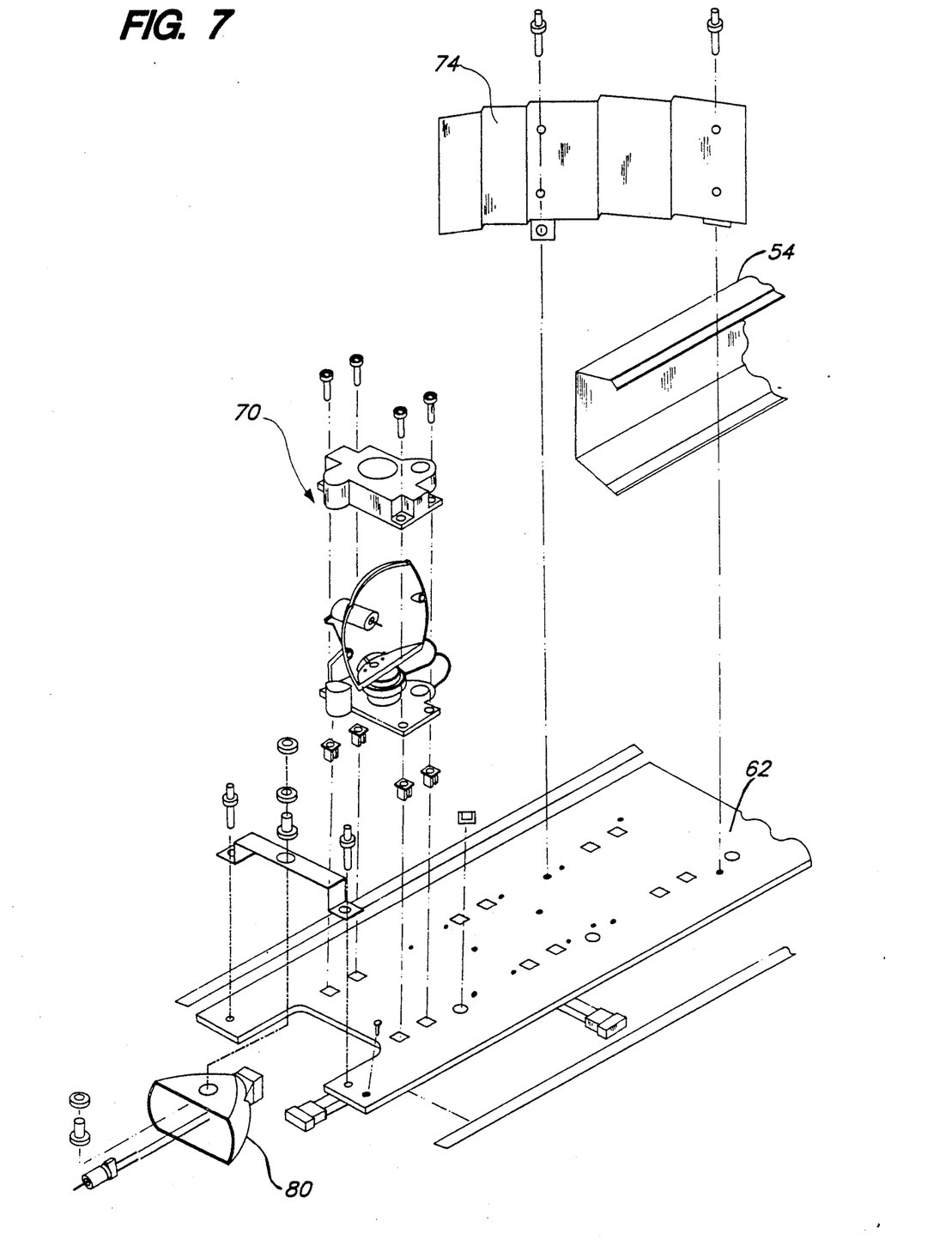
FIG. 7 is an exploded view of a sub-assembly of a lightbar assembly in accordance with the present invention.

The enclosure for each warning and light sub-assembly is essentially an open shell defined between the front and rear lens elements 66 and 68. With reference to FIGS. 1 and 7, the warning light sub-assembly 60 may include one or a plurality of longitudinally spaced rotatable beacon units 70. The number of beacon units 70 may be varied in accordance with the requirements of a given application. If more than one such beacon unit is employed, partitions in the form of reflector plates 74 may be interposed between the rotatable beacon units. The beacon units 70 are identical modular units and are specifically designed to have an efficient low-cost construction so that the rotatable beacon units may be easily dismounted and replaced should they become defective or damaged.

Figure 8:
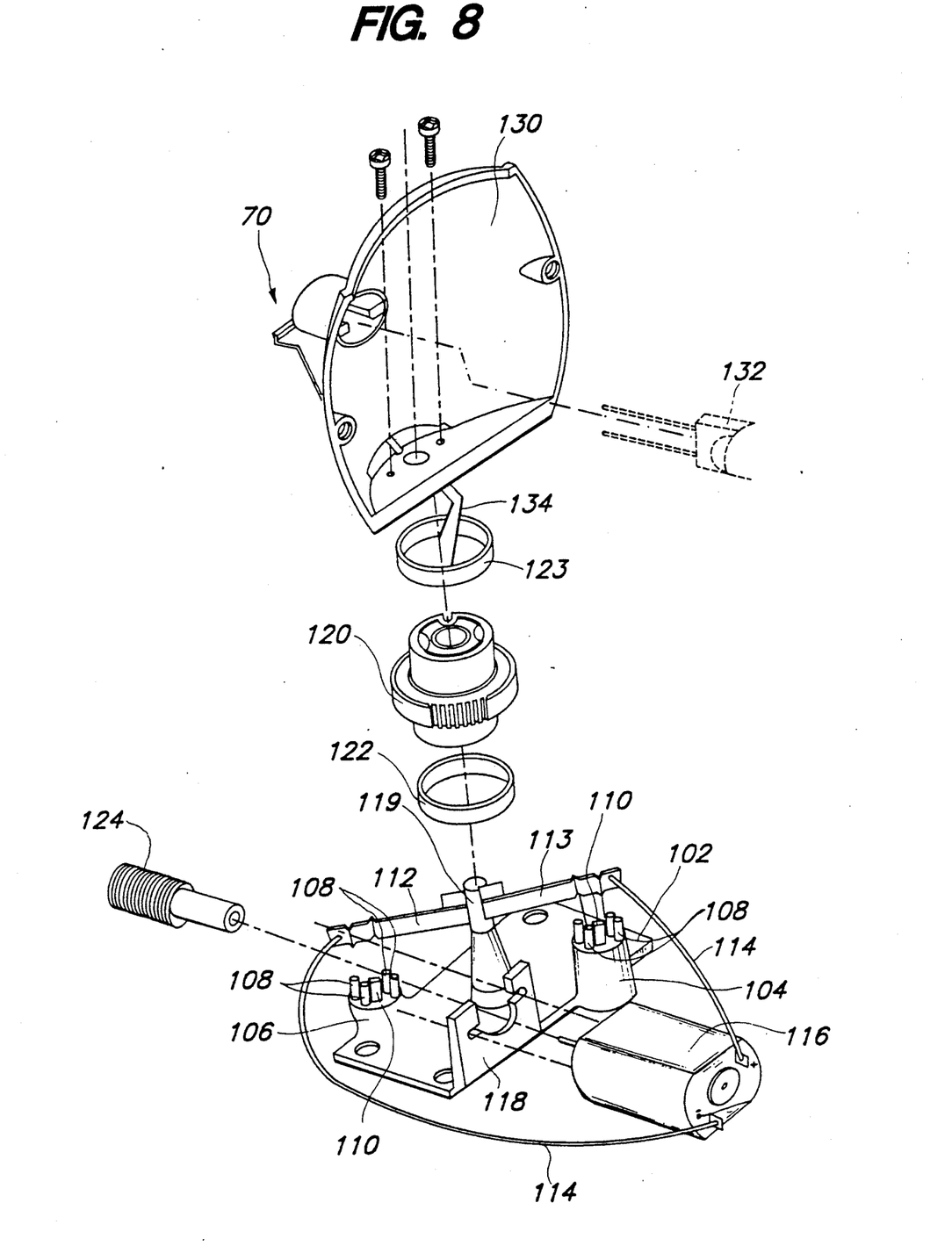
FIG. 8 is an exploded view of a rotating warning beacon unit employed in the lightbar assembly of FIG. 1.

With reference to FIG. 8, the rotatable beacon unit 70 comprises an integral molded base 102 which mounts onto the platform 62. The base 102 has a pair of integral bosses 104 and 106. Each of the bosses include projecting retainer fingers 108 ad a central inverted L-shaped catch 110. The fingers 108 and catch 110 of each of the bosses 104 and 106 cooperatively respectively mount lamp current supply brush assemblies 112 and 113. The brush assemblies 112 and 113 connect via leads 114 with an electric motor 116, such as a Johnson-Model No. HF213G. An upstanding integral bracket 118 extends from the base 102 and defines a slot for mounting the motor 116.

An integral tapered spindle 119 medially located between bosses 104 and 106 forms an upper shaft which rotatably mounts a fifth tooth worm wheel 120. The wheel includes axially spaced rims which mount a pair of brush rings 122 and 123. The brush rings are engaged by the respective brushes 112' and 113'. The motor drives a worm shaft 124 which meshes with the worm wheel 120 for rotatable motion thereof. The rotational axes of the worm shaft 124 and the worm wheel 120 are orthogonal to each other.

A reflector 130, which may comprise a metalized parabolic dish and a bottom panel, is mounted in fixed relationship to the top of the worm wheel 120. A halogen lamp 132, or other suitable light emitter, is mountable in an integrally formed socket of the reflector 130. Electrical leads 134 connected at the rear of the socket extend through a slot in the worm wheel and through an opening of the base plate to complete a current supply path to the filament of lamp 132. It should be appreciated that the rotatable beacon unit 70 has a very efficient one-piece integral motor base/brush holder/spindle configuration which allows a very efficient replacement of the unit from the lightbar assembly if required.

Figure 9:
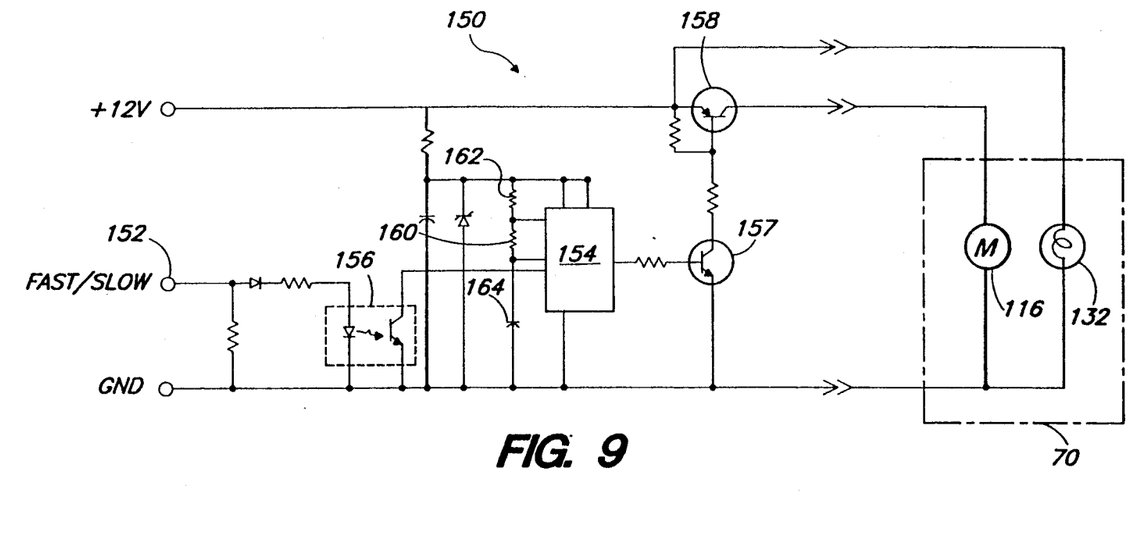
FIG. 9 is a simplified schematic circuit diagram of an electronic controller for the rotating warning beacon unit of FIG. 8.

A motor drive control circuit for the rotating beacon unit 70 is generally designated by the numeral 150 in FIG. 9. The control circuit 150 connects with the vehicle power supply and functions to provide a constant voltage to the lamp 132 and a pulse width modulated voltage to the motor 116. A fast/slow speed selector is coupled to a 555-type integrated circuit timer 154. In the disclosed embodiment the speed selector includes an opto-coupler 156 which functions as a switch. The speed selector is employed to command either a fast or slow speed for motor 116. The control circuit 150 efficiently functions to isolate the modulated power supplied to the motor 116 from the constant power supplied to the lamp 132.

The 555-type timer 154 controls, via a first switching transistor 157, the state of a main switching transistor 158 which is connected in series with the current source and motor 116. When the phototransistor of the optocoupler is in the conductive state, commensurate with a "high" speed command, the timer 154 is disabled by the grounding of pin 2 thereof. Accordingly, main switching transistor 158 will be in the conductive state and the supply voltage will be applied to the DC motor 116. As noted, the state of transistor 158 is controlled by transistor 157 which is in the off state when the timer is not providing output pulses. When pin 2 of timer 154 is released from ground, and the timer delivers pulses to the base of transistor 157, transistor 157 will be periodically rendered conductive. The conduction of transistor 157 will ground the base of transistor 158 and will thus periodically interrupt the flow of current through transistor 158 to motor 116. The resulting pulse width modulation of the supply voltage to motor 116 will lower the average voltage applied to the motor and will accordingly reduce the speed at which the motor will operate. Resistors 160 and 162 and capacitor 164 can be suitably selected to vary output frequency of timer 154 and thereby vary the slow speed of the motor.

Figure 10:
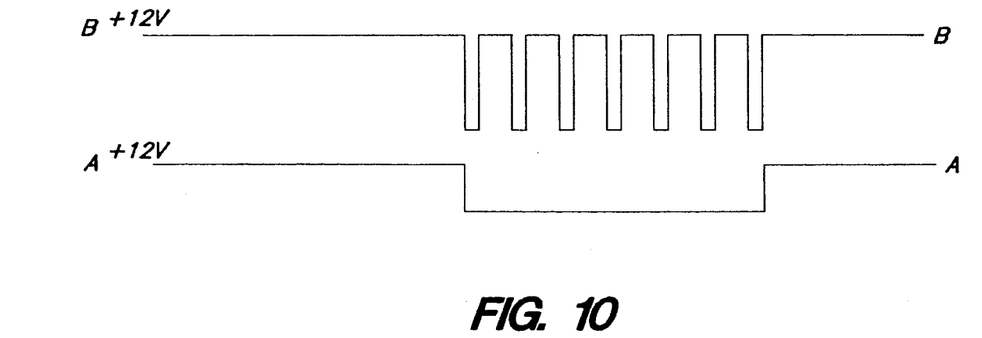
FIG. 10 is a timing diagram depicting the voltage waveforms which appear at various points in the circuit of FIG. 9.

The waveforms for the application of the electrical current to the motor are illustrated in FIG. 10. Graph A illustrates the relationship of the "fast" and "slow" command signals delivered to input terminal 132 of the controller circuit. Graph B shows the voltage applied to the motor 116 for the corresponding "fast" and "slow" speed commands. The controller of the present invention achieves constant temperature operation of the reflector drive motor by the use of pulse width modulation and also keeps the maximum motor drive voltage constant. Additionally, since the switch 158 which achieves the pulse width modulation of the motor supply voltage is "downstream" of the point of connection of the lamp to the power supply, the lamp is effectively isolated from the variations in the motor supply voltage resulting from the operation of the switch 158.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A lightbar assembly for an emergency vehicle comprising:

base means including an elongated base having a bottom panel, said base means further including a front panel and a rear panel respectively integrally extending from a pair of opposed sides of said bottom panel at oblique angles to said bottom panel, said side panels terminating at a pair of generally aligned and spaced free ends, rail means integrally extending from said front and rear panels intermediate said bottom panel and the free ends of said front and rear panels to define a pair of aligned transversely spaced support channels, said front and rear panels having connector means at the free ends thereof;

platform means slidably engageable with said rail means defined channels for forming a component support platform which extends between said front and rear panels, a trough being defined between said platform means and said base means bottom panel;

first lens means for defining a plurality of light transmissive elements, said first lens means including connector means on a pair of oppositely disposed edges thereof, the connector means on the first of said first lens means edges being shaped for engaging a said connector means at the free end of a said base means front panel in a generally tongue and groove-type connection;

second lens means for defining a plurality of light transmissive elements, said second lens means including connector means on a pair of oppositely disposed edges thereof, the connector means on the first of said second lens means edges being shaped for engaging the said connector at the free end of said base means panel in a generally tongue and groove-type connection, the said rear second edges of said first and second lens means being parallelly oriented and spaced when said lens means first edge connectors are engaged with said base means front and rear panel connectors;

opaque cover means substantially coextensive in length with said base means, said cover means having a pair of oppositely disposed edge portions which define connectors which are complementary to the second of said first and second lens means edge connectors whereby said cover means may be connected to said first and second lens means in a generally tongue and groove-type manner, said cover means having a width which exceeds the width of said base means bottom panel; and a pair of end cap means for engaging opposite ends of said base means, lens means and cover means to cooperate therewith to define the enclosure of the lightbar assembly 2. The lightbar assembly of claim 1 further comprising audio warning means mounted on said platform means so as to be housed between said base means and cover means, a portion of said audio warning means defining a portion of said first lens means.

3. The lightbar assembly of claim 1 further comprising at least one light generator means mounted to said platform means and extending into the space between said platform means and said cover means, said light generator means comprising lamp means for emitting light and an associated rotatable reflector, said light generator means further including means for causing rotation of said reflector whereby light is sequentially transmitted through said first and second lens means.

4. A lightbar assembly for an emergency vehicle comprising:

base means for defining a portion of the assembly, said base means including a unitary elongated planar base panel having a pair of oppositely disposed sides extending upwardly therefrom, said base means further including rail means integrally extending from each of said sides to define a pair of inwardly facing transversely spaced support channels, said channels being in an aligned relationship, each of said sides having an upper portion which defines a mounting groove;

platform means slidably received in said support channels for supporting at least a first light generator, said platform means including at least a first planar support platform member;

first generally C-shaped lens means for forming a light transmissive front panel for the assembly, said first lens means having a longitudinally extending tongue on at least a first edge thereof, said tongue being complementary in shape to one of said mounting grooves whereby said tongue may be received in said one mounting groove, a second edge of said first lens means which is disposed oppositely with respect to the said first edge thereof being shaped to define connector means;

second generally C-shaped lens means for forming a light transmissive rear panel for said assembly, said second lens means having a longitudinally extending tongue on a first edge thereof, said tongue on said first edge of said second lens means being complementary in shape to the other of said mounting grooves whereby said second lens means tongue may be received in said other mounting groove, a second edge of said second lens means which is disposed oppositely with respect to the said first edge thereof being shaped to define connector means, said second edges of said first and second lens means being spatially displaced when said tongues are engaged by respective of said base means mounting grooves;

opaque cover means for defining a major portion of the top of the assembly, said cover means being provided with connector means in a pair of oppositely disposed parallel edges thereof, said cover means connector means being complementary to the connector means on the second edges of said first and second lens means whereby said cover means may be mounted to said first and second lens means, said cover means being generally coextensive in length with said base means and having a width which exceeds the width of said base means base panel; and at least first light generator means mounted to said planar support platform member in registration 5. The lightbar assembly of claim 4 further comprising end cap means mounted to end portions of said base means, first lens means, second lens means and cover means for interlocking said base means, first lens means, second lens means and cover means and enclosing said rotatable warning beacon means.

6. The lightbar assembly of claim 5 wherein each of said end cap means defines an opening, a lens cover being mounted in each said opening, lamp means being supported from said platform member so as to be in registration with said end cap lens cover.

7. The lightbar assembly of claim 4 wherein said connector means on said cover means comprise locking grooves and wherein said connector means on the second edges of said first and second lens means comprise tongues which are received in said cover means locking grooves.

8. The lightbar assembly of claim 4 further comprising audio warning means mounted to said base means for generating an audio warning signal.

9. The lightbar assembly of claim 4 wherein said first and second lens means define a first set of lens means and wherein said lightbar assembly further comprises a second set of fist lens means and second lens means, said audio warning means being disposed between said first and second sets of first and second lens means.

10. The lightbar assembly of claim 9 further comprising divider means mounted to said base means at an intermediate longitudinal position for engaging peripheral portions of said first lens and said second lens means for transversely interlocking said first lens means and second lens means.

11. The lightbar assembly of claim 4 wherein said light generator means comprises at least a first rotatable warning beacon and wherein said lightbar assembly further comprises at least three additional rotatable warning beacon means mounted to said platform member.

12. The lightbar assembly of claim 4 further comprising frame means mounted in said support channels, said frame means comprising an upstanding panel and further comprising audio warning means for generating an audio warning signal, said warning means being mounted to said upstanding panel.

13. The lightbar assembly of claim 12 further comprising grill panel means for forming an audio speaker cover, said grill panel means having a tongue received in said first mounting groove.

14. The lightbar assembly of claim 4 wherein said sides extend obliquely from said base means base panel in divergent relationship.

15. The lightbar assembly of claim 4 wherein said light generator means comprises a first rotatable warning beacon mounted to said platform, said warning beacon comprising at least a light source, reflector means for reflecting light from said source, and means for rotating said reflector means so that light from said source is sequentially transmitted through said first and second lens means.

* * * * *

UNITED STATES PATENT AND TRADEMARK OFFICE
CERTIFICATE OF CORRECTION

PATENT NO. : 5,027,260
DATED : June 25, 1991
INVENTOR(S) : Harold W. Lyons It is certified that error appears in the above-identified patent and that said Letters Patent is hereby corrected as shown below:

On the title page:
In the heading, at line [75] "Inventors:" delete "James L. Stopa, Old Saybrook, both of".

Column 1, line 11, change "cares" to -- cars --.

Column 1, line 32, change "states" to -- stated --.

Column 1, line 37, change "Rolls" to -- rails --.

Column 1, line 41, after "facing" insert -- of --.

Claim 4, line 55 (column 9, line 42) after "registration" insert -- with a light transmissive portion of at least one of said lens means --.

Claim 9, line 4 (column 10, line 15) change "fist" to -- first --.

Signed and Sealed this

Twenty-fifth Day of May, 1993

Attest:

MICHAEL K. KIRK

*Attesting Officer*   *Acting Commissioner of Patents and Trademarks*